United States Patent
Coppinger

(10) Patent No.: US 8,966,610 B2
(45) Date of Patent: *Feb. 24, 2015

(54) METHOD AND SYSTEM FOR SECURING DATA FROM A NON-POINT OF SALE DEVICE OVER AN EXTERNAL NETWORK

(75) Inventor: Paul D. Coppinger, Mesa, AZ (US)

(73) Assignee: Apriva, LLC, Scottsdale, AZ (US)

(*) Notice: Subject to any disclaimer, the term of this patent is extended or adjusted under 35 U.S.C. 154(b) by 863 days.

This patent is subject to a terminal disclaimer.

(21) Appl. No.: 12/265,550

(22) Filed: Nov. 5, 2008

(65) Prior Publication Data

US 2010/0115603 A1    May 6, 2010

(51) Int. Cl.
G06F 9/00 (2006.01)
G06F 15/173 (2006.01)
G06F 15/16 (2006.01)
H04L 29/06 (2006.01)
G06Q 20/20 (2012.01)
G06Q 20/38 (2012.01)
G06Q 30/02 (2012.01)
H04L 12/28 (2006.01)

(52) U.S. Cl.
CPC ............ *H04L 63/0236* (2013.01); *G06Q 20/20* (2013.01); *G06Q 20/382* (2013.01); *H04L 63/0272* (2013.01); *G06Q 30/0238* (2013.01); *H04L 12/2859* (2013.01); *H04L 2463/102* (2013.01)
USPC ................................ 726/14; 709/238; 726/11

(58) Field of Classification Search
CPC . G06Q 20/20; G06Q 30/0238; H04L 12/2859
USPC ......................................... 705/67, 17; 726/14
See application file for complete search history.

(56) References Cited

U.S. PATENT DOCUMENTS

| | | | |
|---|---|---|---|
| 6,167,052 A | 12/2000 | McNeill et al. | |
| 6,986,061 B1 | 1/2006 | Kunzinger | |
| 7,209,733 B2 | 4/2007 | Ortiz et al. | |
| 7,437,755 B2 | 10/2008 | Farino et al. | |
| 7,451,926 B2 | 11/2008 | Bykov et al. | |
| 7,512,567 B2* | 3/2009 | Bemmel et al. | 705/67 |
| 7,587,196 B2 | 9/2009 | Hansen | |

(Continued)

FOREIGN PATENT DOCUMENTS

| | | |
|---|---|---|
| JP | 2005020567 | 1/2005 |
| KR | 1020040110866 | 12/2004 |

OTHER PUBLICATIONS

USPTO; Final Office Action dated Jun. 27, 2012 in U.S. Appl. No. 12/265,575.

(Continued)

*Primary Examiner* — Arvin Eskandarnia
*Assistant Examiner* — Margishi Desai
(74) *Attorney, Agent, or Firm* — Snell & Wilmer LLP

(57) ABSTRACT

A data control system prevents non-point of sale devices (135, 155) from sending data over an external network (160) via a secure connection reserved for point of sale devices (125, 145), but allows non-point of sale devices (135, 155) to send data over the external network (160) other than via the secure connection. The secure connection is, for example, a virtual private network connection. The data control system may allow the data from non-point of sale devices (135, 155) to be sent only if it is not destined for a restricted destination. The restricted destination may be, for example, a payment host (170) or secure host (180) on the external network (160).

20 Claims, 10 Drawing Sheets

(56) References Cited

U.S. PATENT DOCUMENTS

| | | | |
|---|---|---|---|
| 7,606,242 B2 | 10/2009 | Whelan et al. | |
| 7,693,507 B2 | 4/2010 | Suzuki et al. | |
| 7,707,225 B2* | 4/2010 | Akashika et al. | 707/785 |
| 7,780,525 B2 | 8/2010 | Walker et al. | |
| 7,877,785 B2 | 1/2011 | Selignan | |
| 7,908,487 B2 | 3/2011 | Williams et al. | |
| 7,953,971 B2 | 5/2011 | Brown et al. | |
| 7,966,263 B2 | 6/2011 | Beeson | |
| 8,005,459 B2 | 8/2011 | Balsillie | |
| 2002/0042774 A1* | 4/2002 | Ortiz et al. | 705/39 |
| 2002/0073042 A1* | 6/2002 | Maritzen et al. | 705/64 |
| 2004/0059634 A1* | 3/2004 | Tami et al. | 705/17 |
| 2004/0128196 A1 | 7/2004 | Shibuno | |
| 2004/0198220 A1 | 10/2004 | Whelan et al. | |
| 2005/0143166 A1 | 6/2005 | Walker et al. | |
| 2005/0254652 A1 | 11/2005 | Engler et al. | |
| 2006/0075472 A1 | 4/2006 | Sanda et al. | |
| 2006/0261159 A1 | 11/2006 | Redick et al. | |
| 2006/0271486 A1* | 11/2006 | Cross et al. | 705/51 |
| 2007/0150732 A1 | 6/2007 | Suzuki et al. | |
| 2007/0175978 A1 | 8/2007 | Stambaugh | |
| 2007/0265935 A1* | 11/2007 | Woycik et al. | 705/26 |
| 2008/0016556 A1 | 1/2008 | Selignan | |
| 2008/0046366 A1* | 2/2008 | Bemmel et al. | 705/44 |
| 2008/0120610 A1 | 5/2008 | Katano et al. | |
| 2008/0183589 A1 | 7/2008 | Dixon et al. | |
| 2008/0208758 A1 | 8/2008 | Spiker et al. | |
| 2008/0228942 A1 | 9/2008 | Lor et al. | |
| 2008/0238610 A1* | 10/2008 | Rosenberg | 340/5.7 |
| 2009/0047959 A1* | 2/2009 | Oba et al. | 455/436 |
| 2009/0228364 A1* | 9/2009 | Economy et al. | 705/17 |
| 2009/0307141 A1 | 12/2009 | Kongalath et al. | |
| 2010/0281249 A1* | 11/2010 | Das et al. | 713/151 |

OTHER PUBLICATIONS

USPTO; Office Action dated Jul. 18, 2012 in U.S. Appl. No. 12/265,568.
USPTO; Final Office Action dated Aug. 23, 2012 in U.S. Appl. No. 12/265,534.
PCT International Search Report and Written Opinion dated Jun. 17, 2010 for International Application No. PCT/US2009/063265, 11 pages.
USPTO; Office Action dated Sep. 27, 2010 in U.S. Appl. No. 12/265,446.
USPTO; Office Action dated Mar. 23, 2011 in U.S. Appl. No. 12/265,534.
USPTO; Office Action dated Mar. 24, 2011 in U.S. Appl. No. 12/265,483.
PCT; International Preliminary Report on Patentability dated May 10, 2011 in Application No. PCT/US2009/063265.
USPTO; Office Action dated Sep. 28, 2011 in U.S. Appl. No. 12/265,568.
USPTO; Office Action dated Mar. 1, 2011 in U.S. Appl. No. 12/265,508.
USPTO; Office Action dated Oct. 25, 2011 in U.S. Appl. No. 12/265,575.
USPTO; Final Office Action dated Nov. 3, 2011 in U.S. Appl. No. 12/265,483.
USPTO; Final Office Action dated Apr. 5, 2011 in U.S. Appl. No. 12/265,446.
USPTO; Final Office Action dated Nov. 9, 2011 in U.S. Appl. No. 12/265,508.
USPTO; Office Action dated Apr. 29, 2013 in U.S. Appl. No. 12/265,568.
USPTO; Final Office Action dated Jul. 1, 2013 in U.S. Appl. No. 12/265,534.
Office Action dated Aug. 13, 2013 in U.S. Appl. No. 12/265,575.
USPTO; Final Office Action dated Jul. 17, 2014 in U.S. Appl. No. 12/265,446.
USPTO; Office Action dated Aug. 5, 2014 in U.S. Appl. No. 12/265,568.
USPTO; Office Action dated Sep. 30, 2014 in U.S. Appl. No. 12/265,508.
USPTO; Office Action dated Sep. 17, 2014 in U.S. Appl. No. 12/265,483.
Office Action dated Dec. 27, 2013 in U.S. Appl. No. 12/265,446.
Final Office Action dated Dec. 27, 2013 in U.S. Appl. No. 12/265,568.
USPTO; Notice of Allowance dated Mar. 27, 2014 in U.S. Appl. No. 12/265,575.
USPTO; Office Action dated Mar. 6, 2014 in U.S. Appl. No. 12/265,534.

* cited by examiner

METHOD AND SYSTEM FOR SECURING DATA FROM A NON-POINT OF SALE DEVICE OVER AN EXTERNAL NETWORK

FIELD OF THE INVENTION

The present invention relates to local area networks and, more particularly, to a local area network with point of sale devices.

BACKGROUND OF THE INVENTION

A point of sale system allows a customer to purchase goods or services from a merchant using a payment card (such as a credit card) issued by a financial institution with which the customer has an account. The system transmits payment information associated with the purchase over a network to a payment host which authorizes and processes the transaction on behalf of a payment processor associated with the financial institution.

A point of sale system may have a number of terminals providing service to customers at multiple physical points within the merchant's business location. Such terminals can now be found in the form of wireless devices that can service payment transactions in a flexible variety of locations. In a restaurant, for example, customers can pay for meals at the table by swiping a payment card at a portable wireless point of sale terminal carried by a waiter. This provides potentially greater efficiency and security as the customer does not have to surrender the payment card to effectuate the payment transaction.

One way of providing such a point of sale system is by utilizing a local area network (LAN) with wireless capability. Such a LAN can be implemented with a wireless router that communicates with one or more wireless devices within a reasonably short range and also connects to an external network. The wireless router can thus allow a number of wireless point of sale terminals in a shop or singularly located business to communicate with the appropriate payment host over the internet, thus allowing for payment transactions to be processed.

As payment transactions involve sensitive cardholder data, it is essential that this data is inaccessible to parties and processes that are not an intended part of the transaction. This inaccessibility may be compromised if point of sale devices are allowed to communicate with non-point of sale devices. This is because point of sale devices are normally designed to prevent unauthorized access or non-payment related uses, whereas non-point of sale devices cannot be assumed to have such restrictions. For this reason, current best practices dictate that point of sale devices should not be allowed to share the same immediate local network with non-point of sale devices. This practice is also mandated by the Payment Card Industry Data Security Standard (PCI-DSS) which has been developed to secure payment card data. Compliance with this standard is very important as it is typically required of merchants by acquirers associated with popular payment cards such as VISA and MasterCard.

Implementing a point of sale system on a LAN as described above therefore introduces security concerns that are not present in conventional systems designed exclusively for point of sale devices. This is because the router that implements the LAN will also have the capability of communication with other devices on the LAN, which may include non-point of sale devices. Although this problem might be solved by the merchant adopting a practice that only point of sale devices can be members of the LAN, there is no simple means of ensuring continual compliance with such a practice. Furthermore, especially in the case of smaller merchants, it may be unreasonable to expect separate physical networks to be maintained for both point of sale devices and other kinds of devices that the merchant may need or wish to operate.

An additional concern is that a router as described above may allow for devices to be connected both wirelessly and by wire. Although this provides a potentially advantageous capability, as a practical matter one form of connection may be less secure than the other, and thus combining both wired and wireless connections on a same LAN may potentially weaken the security of devices connected by the more secure method. It is therefore desirable to provide a means for securing data on a local area network with point of sale devices as well as non-point of sale devices. It is also desirable to provide a means for securing data when such a local area network has both wired and wireless devices.

BRIEF DESCRIPTION OF THE DRAWINGS

The invention is described in terms of the preferred embodiments set out below and with reference to the following drawings in which like reference numerals are used to refer to like elements throughout.

It should be understood that the flow diagrams provided herein represent logical relationships among functions in order to generally illustrate functional elements that are provided in various embodiments of the invention. One of ordinary skill in the art will recognize that the elements described in these flow diagrams may be arranged differently while still, where consistent with the description herein, remaining within the spirit and scope of the invention.

DETAILED DESCRIPTION

A method and system are described for securing data on a local area network (LAN) that includes point of sale devices as well as non-point of sale devices. A point of sale device can be defined as a device which is dedicated to processing point of sale transactions and which stores, processes or transmits cardholder data or other sensitive information related to processing a payment made by a payment card, and is thus designed to prevent unauthorized access or uses unrelated to payment transactions. A non-point of sale device can be defined as a computing device which is capable of sending data to and/or receiving data from other devices but which is not a point of sale device as defined above.

In one aspect of the invention, a point of sale network is defined within the LAN which includes point of sale devices but excludes non-point of sale devices. In a second aspect of the invention, point of sale devices are prevented from sending data to non-point of sale devices on the LAN. In a third aspect of the invention, point of sale devices are prevented from sending data to an external network other than via a secure connection. In a fourth aspect of the invention, non-point of sale devices are prevented from sending data to point of sale devices on the LAN. In a fifth aspect of the invention, non-point of sale devices are prevented from sending data to the external network via a secure connection reserved for point of sale devices. In a sixth aspect of the invention, point of sale devices are prevented from receiving data from the external network other than via a secure connection. In a seventh aspect of the invention, non-point of sale devices are allowed to receive data from the external network when established conditions are met. By controlling the data in this fashion, cardholder data and other sensitive information related to point of sale transactions are protected even though the point of sale devices share the LAN with non-point of sale devices.

In the above described aspects, the LAN may include wired point of sale or non-point of sale devices as well as wireless point of sale or non-point of sale devices. In correspondingly appropriate variations of the above described aspects, wireless devices may be prevented from sending data to wired devices and wired devices may be prevented from sending data to wireless devices. Other aspects, additions and variations will be apparent to one of ordinary skill in the art based on the description herein.

Configuration

Figure 1:
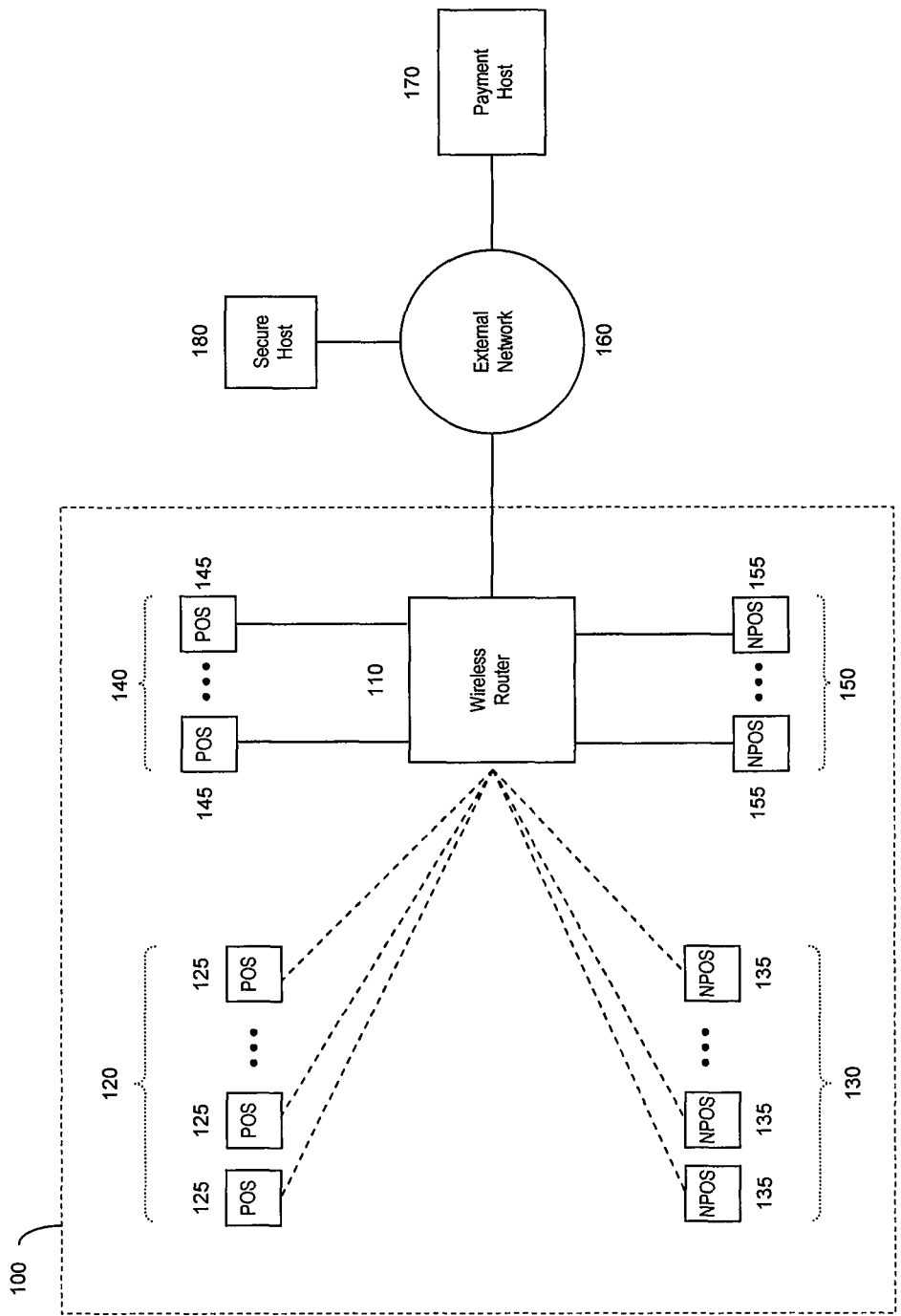
FIG. 1 is a block diagram illustrating a system in which an embodiment of the invention is provided.

FIG. 1 is a block diagram illustrating a system in which an embodiment of the invention is provided. The system has a system LAN 100 which includes and is implemented by a wireless router 110. The system LAN 100 includes a wireless point of sale LAN 120, wireless non-point of sale LAN 130, wired point of sale LAN 140 and wired non-point of sale LAN 150. The system LAN 100 is also connected to an external network 160 which is, for example, a wide area network (WAN) such as the internet. A payment host 170 is connected to the external network 160. The payment host 170 processes payment transactions initiated by point of sale devices on the system LAN 100. A secure host 180 is also provided on the external network 160. The secure host 180 secures data that is transmitted between the system LAN 100 and the payment host 170, and may also provide additional functions related to payment processing and configuration and security of the system LAN 100.

The wireless router 110 is a conventional wireless router that is capable of being configured to provide the functions described herein. In a preferred embodiment, the wireless router 110 is an ASUS WL-500g Premium running OpenWrt, a version of the Linux operating system for embedded devices. The wireless router 110 includes one or more Wi-Fi antennas which transmit and receive to and from devices on the wireless point of sale LAN 120 and wireless non-point of sale LAN 130. The wireless router 110 may also include Ethernet ports which connect to devices on the wired point of sale LAN 140 and wired non-point of sale LAN 150. The wireless router 110 also includes a WAN port which connects to the external network 160.

The wireless router 110 defines the wireless point of sale LAN 120, wireless non-point of sale LAN 130, wired point of sale LAN 140 and wired non-point of sale LAN 150 each as a separate virtual LAN (VLAN.) Only point of sale devices can be members of the wireless point of sale LAN 120 or wired point of sale LAN 140, and only non-point of sale devices can be members of the wireless non-point of sale LAN 130 or wired non-point of sale LAN 150. Additionally, only wireless devices can be members of the wireless point of sale LAN 120 or wireless non-point of sale LAN 130, and only wired devices can be members of the wired point of sale LAN 140 or wired non-point of sale LAN 150. One of ordinary skill in the art will readily implement appropriate VLANs to accomplish such rules consistent with the objectives and environment at hand in accordance with the general description provided herein.

The wireless point of sale LAN 120 includes one or more wireless point of sale devices 125 which communicate wirelessly with the wireless router 110. The wired point of sale LAN 140 includes one or more wired point of sale devices 145 connected by wire to the wireless router 110. A wireless point of sale device 125 or wired point of sale device 145 may be, for example, a point of sale terminal which accepts payment information in order to process a sales transaction. A wireless point of sale device 125 or wired point of sale device 145 could also be a dedicated computer which processes payment transactions or administers point of sale devices and related configuration information.

The wireless non-point of sale LAN 130 includes one or more wireless non-point of sale devices 135 which communicate wirelessly with the wireless router 110. The wired non-point of sale LAN 150 includes one or more wired non-point of sale devices 155 connected by wire to the wireless router 110. A wireless non-point of sale device 135 or wired non-point of sale device 155 may be, for example, a personal computer used by one or more individuals affiliated with the merchant who maintains the system LAN 100. Such individuals may use the personal computer for web browsing, email or numerous other purposes that warrant at least partially unrestricted access by the personal computer to hosts or devices on the external network 160 or system LAN 100, as well as access to the personal computer by such hosts or devices.

Configuration of the Point of Sale LAN

In one aspect of the invention, a data control system defines within a local area network a point of sale network which includes point of sale devices but excludes non-point of sale devices. The data control system is implemented by a router working in combination with a secure host on an external network to which the router is connected. The point of sale devices may include wireless devices which communicate wirelessly with the router such as via a Wi-Fi connection, and may also include wired devices connected by wire to the router such as via an Ethernet connection. Similarly, the non-point of sale devices may be wireless or wired devices. The data control system may additionally define a non-point of sale network which includes the non-point of sale devices. The point of sale network and the non-point of sale network may each be defined as a virtual local area network.

Figure 2:
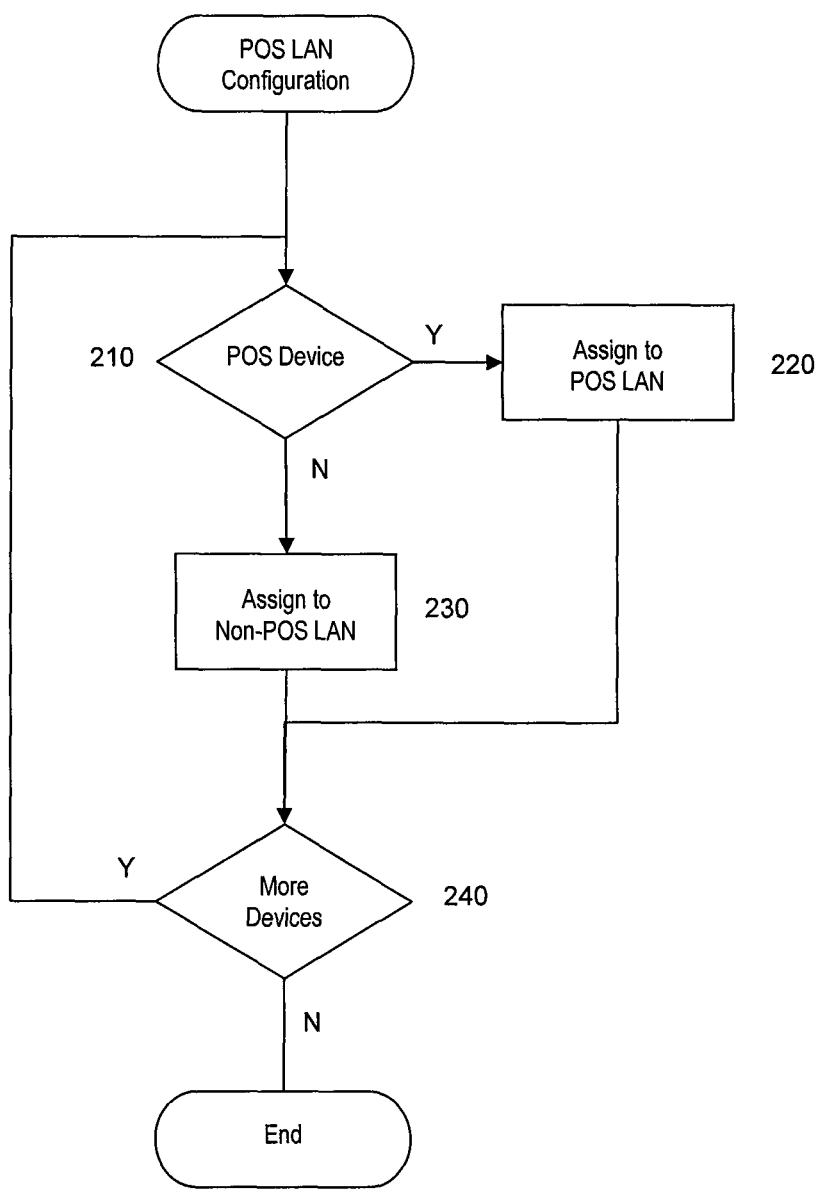
FIG. 2 is a flow diagram illustrating configuration of a point of sale LAN in accordance with an embodiment of the invention.

FIG. 2 is a flow diagram illustrating configuration of a wireless point of sale LAN in accordance with an embodiment of the invention. The process shown in FIG. 2 defines a wireless point of sale LAN which includes point of sale devices and excludes non-point of sale devices. This process is performed by the wireless router 110 at an initial configuration of the system LAN 100 and may also be performed at any later time as necessary to update the configuration, such as when a new device is added to the system LAN 100.

In step 210, the wireless router 110 determines whether a device that is being introduced to the configuration is a point of sale device. The wireless router 110 may determine this in any number of ways, such as with reference to information provided by the secure host 180. If the wireless router 110 determines that the device being introduced to the configuration is a point of sale device, it assigns the device to a point of sale LAN in step 220.

Where the device is a wireless device, one possible implementation of step 220 can be described as follows. The wireless router 110 will have previously assigned a unique service set identifier (SSID) to the wireless point of sale LAN 120. The wireless router 110 assigns the wireless device to the wireless point of sale LAN 120 as a wireless point of sale device 125 by associating a unique device identifier of the wireless point of sale device 125 with the SSID of the wireless point of sale LAN 120. The device identifier may be, for example, a media access control (MAC) address of the wireless point of sale device 125.

Where the device is a wired device, one possible implementation of step 220 can be described as follows. The wireless router 110 will have previously assigned one or more ports (such as Ethernet ports) to the wired point of sale LAN 140. The wireless router 110 assigns the wired device to the wired point of sale LAN 140 as a wired point of sale device 145 by, for example, associating a device identifier of the wired point of sale device 145 with one of the ports assigned to the wired point of sale LAN 140. As described above, the device identifier may be, for example, a media access control (MAC) address of the wired point of sale device 145.

Returning to step 210, if the wireless router 110 instead determines that the device is not a point of sale device, it assigns the device to a non-point of sale LAN in step 230. Where the device is a wireless device, a possible implementation of step 230 can be described as follows. The wireless router 110 will have previously assigned a second unique service set identifier (SSID) to the wireless non-point of sale LAN 130 that is different from the SSID of the wireless point of sale LAN 120. The wireless router 110 assigns the wireless device to the wireless non-point of sale LAN 130 as a wireless non-point of sale device 135 by, for example, associating a device identifier of the wireless non-point of sale device 135 with the SSID of the wireless non-point of sale LAN 130. The device identifier may be, for example, a media access control (MAC) address of the wireless point of sale device 125.

Where the device is a wired device, a possible implementation of step 230 can be described as follows. The wireless router 110 will have previously assigned to the wired non-point of sale LAN 150 a second group of one or more ports (such as Ethernet ports) all or which are different from the ports assigned to the wired point of sale LAN 140. The wireless router 110 assigns the device to the wired non-point of sale LAN 150 as a wired non-point of sale device 155 by associating a device identifier of the wired non-point of sale device 155 with one of the second group of ports assigned to the wired non-point of sale LAN 150. As above, the device identifier may be, for example, a media access control (MAC) address of the wired non-point of sale device 155.

If the wireless router 110 determines in step 240 that there are still more devices that have been introduced to the system LAN 100, the wireless router 110 repeats the above-defined process until all devices have been assigned.

Data Control

FIGS. 3-9 are flow diagrams illustrating the data control that is performed in various aspects of the invention. FIGS. 3-9 are performed by a data control system which comprises the wireless router 110 and, depending on the implementation, may also include the secure host 180 in the case of some functional elements. The flow diagrams provided herein represent logical relationships among functions in order to generally illustrate functional elements that are provided in various embodiments of the invention. The processes shown in FIGS. 3-9 are broken out and arranged for the purpose of logically describing the functional concepts in various aspects of the invention. One of ordinary skill in the art will recognize that the elements described in these flow diagrams may be arranged differently while still, where consistent with the description herein, remaining within the spirit and scope of the invention. For example, the steps described may be performed in different sequential or event-driven orders in alternative versions of the aspects represented.

Figure 3:
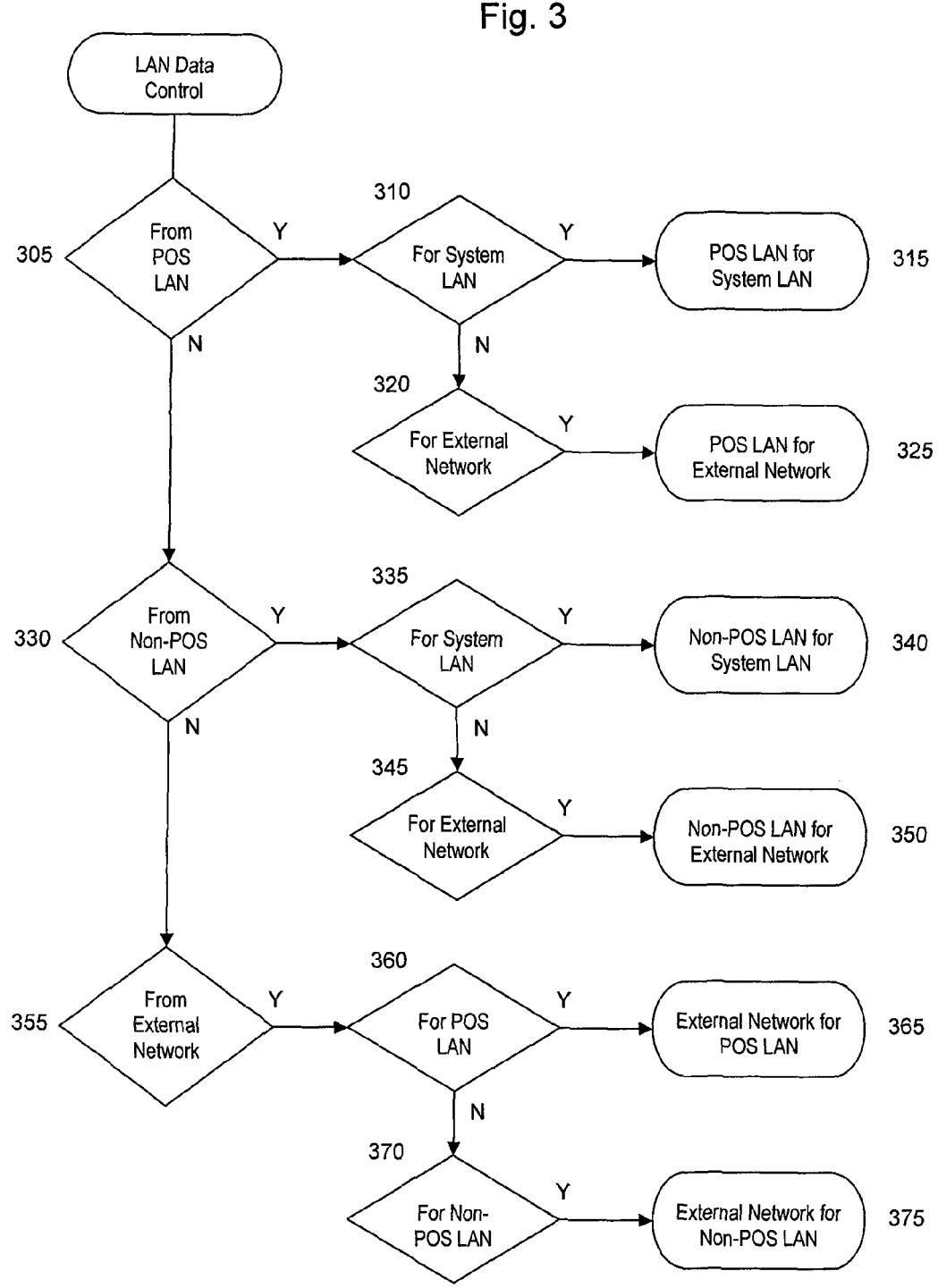
FIG. 3 is a flow diagram illustrating the data control performed by a data control system in various aspects of the invention.

FIG. 3 is a flow diagram which shows the different data control processes performed depending on the source and destination of data processed by the data control system. The data control system performs the process shown in FIG. 3 upon receipt by the wireless router 110 of a data packet from any source on the system LAN 100 or from the external network 160. In step 305, the data control system determines whether the data is from a point of sale LAN. For example, the wireless router 110 determines whether the data is associated with an SSID corresponding to the wireless point of sale LAN 120 or a port assigned to the wired point of sale LAN 140.

Where is it determined in step 305 that the data is from a point of sale LAN, the data control system determines in step 310 whether the data is destined for a device on the system LAN 100. For example, the wireless router 110 examines the data packet to determine whether the destination IP address contained therein corresponds to a wireless point of sale device 125 on the wireless point of sale LAN 120, a wired point of sale device 145 on the wired point of sale LAN 140, a wireless non-point of sale device 135 on the wireless non-point of sale LAN 130, or a wired non-point of sale device 155 on the wired non-point of sale LAN 150.

If the data from the point of sale LAN is destined for a device on the system LAN 100, the data control system performs the "POS LAN for System LAN" process in step 315. This process will be described with reference to FIG. 4 below. If the data from the point of sale LAN is not destined for a device on the system LAN 100, the data control system determines in step 320 whether the data is destined for the external network 160. For example, the wireless router 110 examines the data packet to determine whether the destination IP address contained therein corresponds to an external internet address. If so, the data control system performs the "Point of Sale LAN for External Network" process in step 325. This process will be described with reference to FIG. 5 below.

In step 330, the data control system determines whether the data is from a non-point of sale LAN. For example, the wireless router 110 determines whether the data is associated with an SSID corresponding to the wireless non-point of sale LAN 130 or from a port assigned to the wired non-point of sale LAN 150. Where it is determined in step 330 that the data is from a non-point of sale LAN, the data control system determines in step 335 whether the data is destined for a device on the system LAN 100. For example, the wireless router 110 examines the data packet to determine whether the destination IP address contained therein corresponds to an internal IP address of the wireless point of sale device 125 on the wireless point of sale LAN 120, a wired point of sale device 145 on the wired point of sale LAN 140, a wireless non-point of sale device 135 on the wireless non-point of sale LAN 130 or a wired non-point of sale device 155 on the wired non-point of sale LAN 150.

If the data from the non-point of sale LAN is destined for a device on the system LAN 100, the data control system performs the "Non-POS LAN for System LAN" process in step 340. This process will be described with reference to FIG. 6 below. If the data from the non-point of sale LAN is not destined for a device on the system LAN 100, the data control system determines in step 345 whether the data is destined for the external network 160. For example, the wireless router 110 examines the data packet to determine whether the destination IP address contained therein corresponds to an external internet address. If so, the wireless router 110 performs the "Non-POS LAN for External Network" process in step 350. This process will be described with reference to FIG. 7 below.

In step 355, the data control system determines whether the data is from the external network 160. For example, the wireless router 110 determines whether the data is received from a wide area network (WAN) port through which the router 110 is connected to the external network 160. If so, the data control system determines whether the data is destined for a point of sale LAN. For example, the wireless router 110 examines the data packet to determine whether the destination IP address contained therein corresponds to a wireless point of sale device 125 on the wireless point of sale LAN 120 or a wired point of sale device 145 on the wired point of sale LAN 140.

If the data from the external network is destined for a point of sale device, the data control system performs the "External Network for POS LAN" process in step 365. This process will be described with reference to FIG. 8 below. If the data from the external network is not destined for a point of sale LAN, the data control system determines in step 370 whether the data is destined for a non-point of sale LAN. For example, the wireless router 110 examines the data packet to determine whether the destination IP address contained therein corresponds to a wireless non-point of sale device 135 on the wireless non-point of sale LAN 130 or a wired non-point of sale device 155 on the wired non-point of sale LAN 150. If the data is destined for a non-point of sale LAN, the wireless router 110 performs the "External Network for Non-POS LAN" process in step 375. This process will be described with reference to FIG. 9 below.

Data from the Point of Sale LAN Over the System LAN

In another aspect of the invention, a data control system for a local area network prevents point of sale devices from sending data to non-point of sale devices but allows point of sale devices to send data to other point of sale devices on the local area network. The data control system may define a point of sale network within the local area network and determine the data is from the point of sale network if the data is associated with a service set identifier corresponding to a wireless point of sale network or a port corresponding to a wired point of sale network. The data control system may also allow data to be sent to a point of sale device only if it is represented on a white list of approved point of sale devices. The data control system may also prevent wireless point of sale devices from sending data to wired point of sale devices and prevent wired point of sale devices from sending data to wireless point of sale devices.

Figure 4:
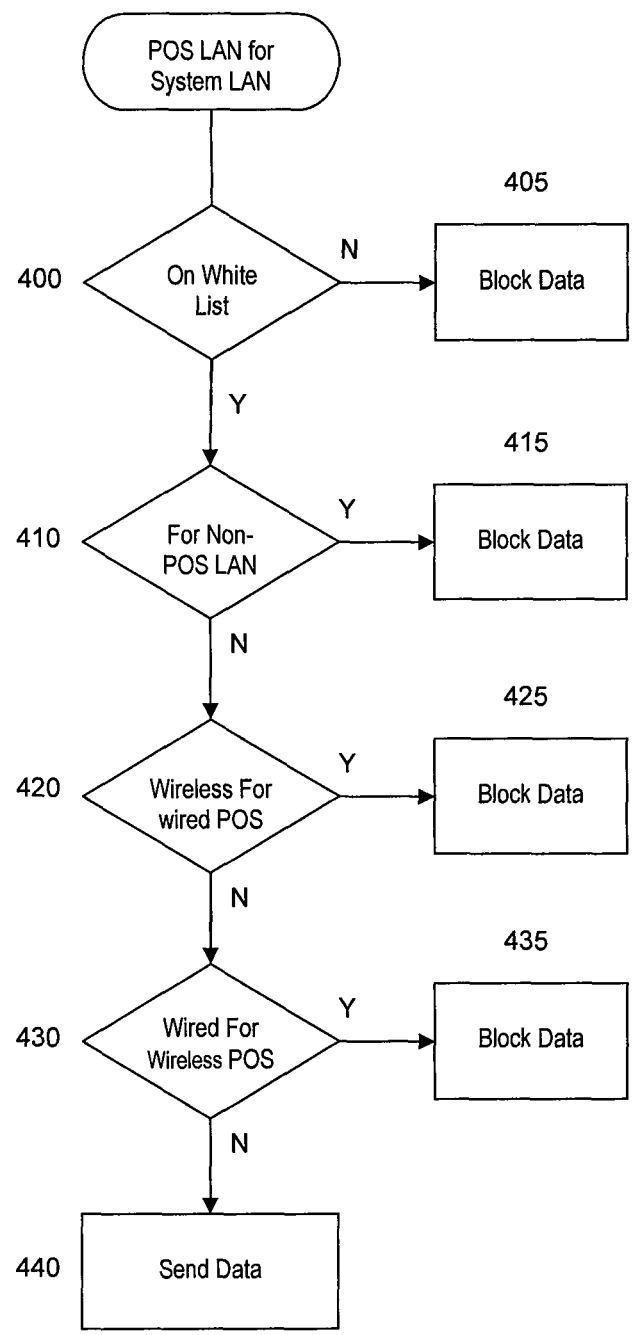
FIG. 4 is a flow diagram illustrating a process performed by the data control system for data from a point of sale LAN that is destined for a location on the system LAN.

FIG. 4 is a flow diagram illustrating the "POS LAN for System LAN" process performed by the data control system for data from a point of sale LAN that is destined for a location on the system LAN. The data is received, for example, from the wireless point of sale LAN 120 or the wired point of sale LAN 140. In step 400, the data control system determines whether the device from which the data is received is on a white list of approved point of sale devices. In one possible embodiment, the white list is maintained by the wireless router 110 based on information received from the secure host 180. The white list contains, for example, a media access control (MAC) address of each wireless point of sale device 125 or wired point of sale device 145 that has been approved as a point of sale device on the system LAN. Management of the white list is described later in the specification with reference to FIG. 10.

If the data is from a device that is not on the white list, the data control system blocks the data from being sent in step 405. This could occur, for example, where a point of sale device has been introduced to the system LAN 100 but has not been approved for membership in a point of sale network within the system LAN 100. If the device from which the data is received is on the white list, the data control system determines in step 410 whether the data from the point of sale LAN is destined for a non-point of sale device. For example, the wireless router 110 examines the data packet to determine whether the destination IP address contained therein corresponds to a wireless non-point of sale device 135 on the wireless non-point of sale LAN 130 or a wired non-point of sale device 155 on the wired non-point of sale LAN 150. If the data is destined for a non-point of sale device, the wireless router 110 blocks the data from being sent to the non-point of sale device in step 415.

In step 420, the data control system determines whether the data is from a wireless point of sale device and destined for a wired point of sale device. For example, the wireless router 110 determines whether the data is associated with an SSID assigned to the wireless point of sale LAN 120 and examines the data packet to determine whether the destination IP address contained therein corresponds to a wired point of sale device 145 on the wired point of sale LAN 140. If so, the wireless router 110 blocks the data from being sent to the wired point of sale LAN 140 in step 425.

In step 430, the data control system determines whether the data is from a wired point of sale device and destined for a wireless point of sale device. For example, the wireless router 110 determines whether the data is from a port assigned to a wired point of sale device 145 on the wired point of sale LAN 140 and examines the data packet to determine whether the destination IP address contained therein corresponds to a wireless point of sale device 125 on the wireless point of sale LAN 120. If so, the wireless router 110 blocks the data from being sent to the wireless point of sale LAN 120 in step 435.

In step 440, the data control system allows the point of sale device to send data over the system LAN 100 having confirmed that the data is not destined for a non-point of sale device and is not from a wireless to a wired device or from a wired to a wireless device. In a preferred embodiment, a form of encryption is employed to protect the data sent over the system LAN 100. For example, the wireless point of sale device 125 and wireless router 110 utilize Wi-Fi Protected Access (WPA) encryption to encrypt the data. A WPA passphrase will have been created by the secure host 180 and provided to the merchant to enter into the wireless point of sale device 125 at the time of configuration.

Data from the Point of Sale LAN Over the External Network

In another aspect of the invention, the data control system allows point of sale devices to send data to the external network via a secure connection but prevents the point of sale devices from sending data to the external network other than via the secure connection. The secure connection is, for example, a virtual private network connection. The data control system may allow only devices on a white list of approved point of sale devices to send data to the external network. The data control system may also allow the point of sale devices to send data only to an authorized destination on the external network.

Figure 5:
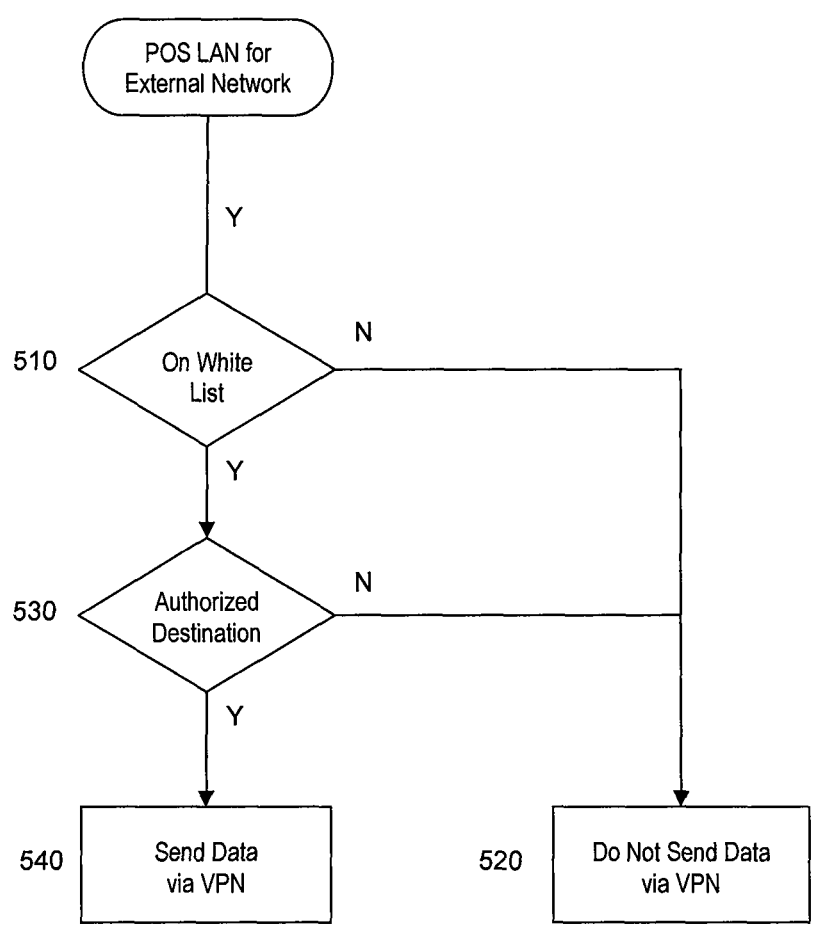
FIG. 5 is a flow diagram illustrating a process performed by the data control system for data from a point of sale LAN that is destined for a location on the external network.

FIG. 5 is a flow diagram illustrating the "POS LAN for External Network" process performed by the data control system for data from a device on a point of sale LAN that is destined for a location on the external network. The device may be on the wireless point of sale LAN 120 or on the wired point of sale LAN 140. The process illustrated in FIG. 5 allows the device to send data over the external network 160 under certain circumstances, but only via a secure connection. The secure connection is, for example, a virtual private network (VPN) connection which provides a secure pathway over the external network 160 from the router 110 to a particular destination such as the payment host 170 or the secure host 180. The VPN is created, for example, by an OpenVPN software program on the wireless router 110. An OpenVPN server on the secure host 180 interacts with the OpenVPN program on the wireless router 110 to establish an encrypted VPN tunnel between the wireless router 110 and the secure host 180 using a VPN session key that is periodically renegotiated, preferably at least once every 24 hours.

In step 510, the data control system determines whether the device attempting to send data to the external network 160 is on a white list of approved POS devices. In one possible embodiment, as explained with reference to FIG. 4, the white list is maintained by the wireless router 110 based on information received from the secure host 180 and contains, for example, the MAC address of each wireless point of sale device 125 or wired point of sale device 145 that has been approved as a point of sale device on the system LAN. If the data is from a device that is not on the white list, the data control system prevents the data from being sent over the VPN in step 520. As noted above, this could occur where a point of sale device has been introduced to the system LAN 100 but has not been approved for membership in a point of sale network within the system LAN 100.

In one embodiment, the data control system may block the data altogether when it is not from a POS device on the white list. In an alternative embodiment, the data control system may allow the data to be sent to a location on the external network 160 via an unsecure connection, either without restriction or limited to specified locations.

In addition determining in step 510 that the data is from a point of sale device on the white list, the data control system determines in step 530 whether the point of sale device is attempting to send data to an authorized destination on the external network 160. In one possible implementation, the wireless router 110 examines the data packet to determine whether the destination IP address contained therein corresponds to the IP address of the secure host 180 or payment host 170, and if not, prevents the data from being sent over the VPN in step 520. In another possible implementation, the wireless router 110 may allow all data from a point of sale device on the white list to be sent via the VPN to the secure host 180, and the secure host 180 may determine whether the data can be sent further depending on whether it is destined for an authorized destination.

Upon determining that the data is from a point of sale device on the white list and determining that the data is destined for an authorized destination, the data control system allows the point of sale device in step 540 to send the data to the external network 160 via the VPN. The secure connection of the VPN protects the data when sent from the wireless router 110 over the external network 160. In a preferred embodiment, a form of encryption is also employed to protect the data exchanged between the point of sale device and the wireless router 110. For example, the wireless point of sale device 125 and wireless router 110 utilize Wi-Fi Protected Access (WPA) encryption to encrypt the data. A WPA passphrase will have been created by the secure host 180 and provided to the merchant to enter into the wireless point of sale device 125 at the time of configuration.

Data from the Non-Point of Sale LAN Over the System LAN

In another aspect of the invention, a data control system for a local area network prevents non-point of sale devices from sending data to point of sale devices on the local area network but allows non-point of sale devices to send data to other non-point of sale devices on the local area network. The data control system may define a non-point of sale network within the local area network and determine the data is from the non-point of sale network if the data is associated with a service set identifier corresponding to a wireless non-point of sale network or a port corresponding to a wired non-point of sale network. The data control system may also prevent wireless non-point of sale devices from sending data to wired non-point of sale devices and prevent wired non-point of sale devices from sending data to wireless non-point of sale devices.

Figure 6:
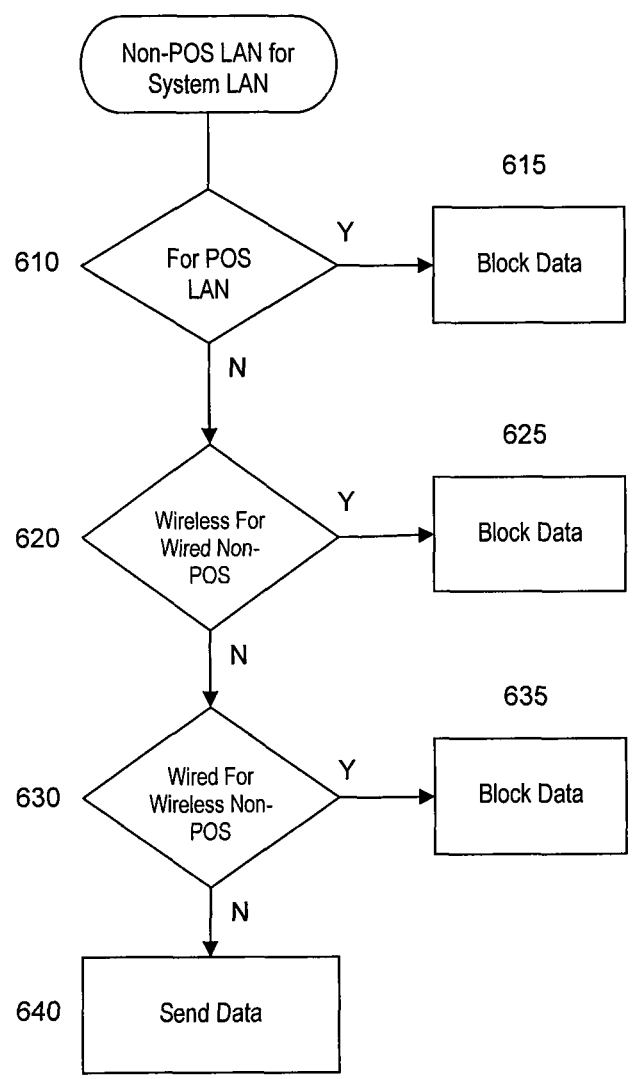
FIG. 6 is a flow diagram illustrating the process performed by the data control system for data from a non-point of sale device that is destined for a location on the system LAN.

FIG. 6 is a flow diagram illustrating the "Non-POS LAN for System LAN" process performed by the data control system for data from a non-point of sale LAN that is destined for a location on the system LAN. The non-point of sale LAN may be the wireless non-point of sale LAN 130 or the wired non-point of sale LAN 150. In step 610, the wireless router 110 determines whether the data from the non-point of sale LAN is destined for a point of sale device. For example, the wireless router 110 examines the data packet to determine whether the destination IP address contained therein corresponds to a wireless point of sale device 125 on the wireless point of sale LAN 120 or a wired point of sale device 145 on the wired point of sale LAN 140. If the data is destined for a point of sale device, the data control system blocks the data from being sent to the non-point of sale device in step 615.

In one embodiment, upon determining in step 610 that the data from the non-point of sale LAN is destined for a point of sale device, the data control system in step 640 allows the non-point of sale device to send the data over the system LAN 100 without regard to whether communication between wired and wireless devices is involved. In another embodiment, additional steps 620 and 630 may be taken to separate wired and wireless non-point of sale devices similar to the separation of wired and wireless point of sale devices described above.

In step 620, the data control system determines whether the data is from a wireless non-point of sale device and destined for a wired non-point of sale device. For example, the wireless router 110 determines whether the data is associated with an SSID assigned to the wireless non-point of sale LAN 130 and examines the data packet to determine whether the destination IP address contained therein corresponds to a wired non-point of sale device 155 on the wired point of sale LAN

150. If so, the wireless router 110 blocks the data from being sent to the wired non-point of sale device 155 in step 625.

In step 630, the data control system determines whether the data is from a wired non-point of sale device to a wireless non-point of sale device. For example, the wireless router 110 determines whether the data is from a port assigned to a wired non-point of sale device 155 on the wired non-point of sale LAN 150 and examines the data packet to determine whether the destination IP address contained therein corresponds to a wireless non-point of sale device 135 on the wireless non-point of sale LAN 130. If so, the wireless router 110 blocks the data from being sent to the wireless non-point of sale device 135 in step 635.

In step 640, having confirmed that the data is not destined for a point of sale device or from a wireless to wired or wired to wireless device, the data control system allows the non-point of sale device to send the data over the system LAN 100. In order to protect the data sent over the system LAN 100, some form of encryption may be employed. For example, the wireless non-point of sale device 135 and wireless router 110 may utilize Wi-Fi Protected Access (WPA) encryption to encrypt the data. A WPA passphrase will have been created by the secure host 180 and provided to the merchant to enter into the wireless point of sale device 125 at the time of configuration.

Data from the Non-Point of Sale LAN Over the External Network

In another aspect of the invention, the data control system prevents non-point of sale devices from sending data over the external network via a secure connection reserved for point of sale devices, but allows non-point of sale devices to send data over the external network other than via the secure connection. The secure connection is, for example, a virtual private network connection. The data control system may allow the data from non-point of sale devices to be sent only if it is not destined for a restricted destination. The restricted destination may be, for example, the secure host or the payment host.

Figure 7:
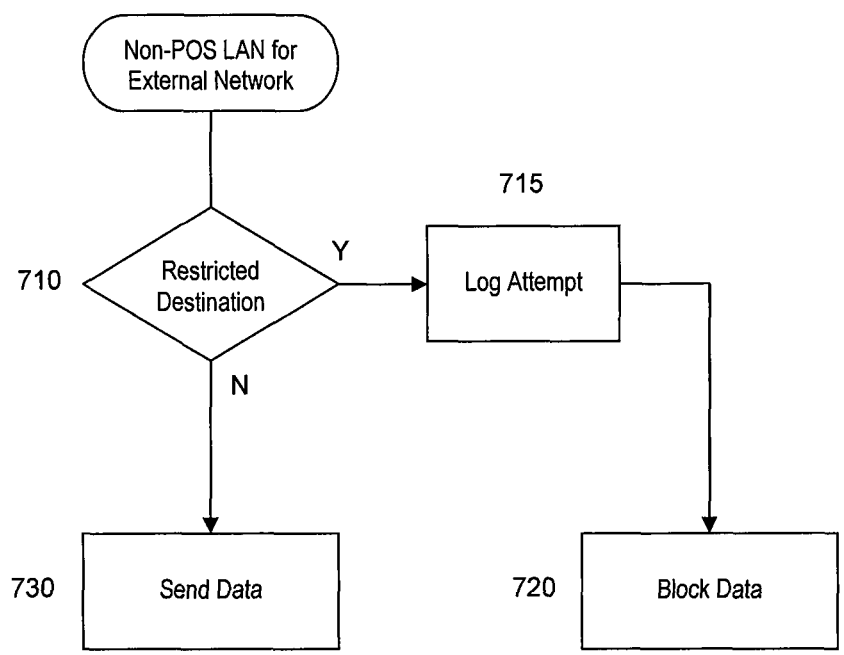
FIG. 7 is a flow diagram illustrating the process performed by the data control system for data from a non-point of sale device that is destined for a location on the external network.

FIG. 7 is a flow diagram illustrating the "Non-POS LAN for External Network" process performed by the data control system for data from a non-point of sale device that is destined for a location on the external network. The non-point of sale device may be a wireless non-point of sale device 135 on the wireless non-point of sale LAN 130 or a wired non-point of sale device 155 on the wired non-point of sale LAN 150. In step 710, the data control system determines whether the data from the non-point of sale device is destined for a restricted destination on the external network 160. For example, the data control system examines the data packet to determine whether the destination IP address contained therein corresponds to the IP address of the payment host 170 or the secure host 180. If the data control system determines in step 710 that the data is destined for a restricted destination on the external network 160, the data control system logs the attempt to connect to the external network 160 in step 715 and then blocks the data from being sent over the external network 160 in step 720. The log may be provided from the wireless router 110 to the secure host 160 and utilized, for example, to monitor the system LAN 100.

Upon determining that the data is not destined for a restricted destination on the external network 160, the data control system sends the data over the external network 160 in step 730. In a preferred embodiment, a form of encryption may be employed to protect the data exchanged between the point of sale device and the wireless router 110. For example, the wireless non-point of sale device 135 and wireless router 110 may utilize Wi-Fi Protected Access (WPA) encryption to encrypt the data. A WPA passphrase will have been created by the secure host 180 and provided to the merchant to enter into the wireless point of sale device 125 at the time of configuration.

Data from the External Network Over the Point of Sale LAN

In another aspect of the invention, the data control system allows point of sale devices on the local area network to receive data from the external network if received from the external network via a secure connection, but prevents point of sale devices from receiving data from the external network if not received via a secure connection. The secure connection is, for example, a virtual private network connection. The data control system may allow the data to be sent to the point of sale device only if it is associated with a communication session initiated by the point of sale device. The data control system may also allow the data to be sent to the point of sale device only if it is received from an authorized source on the external network.

Figure 8:
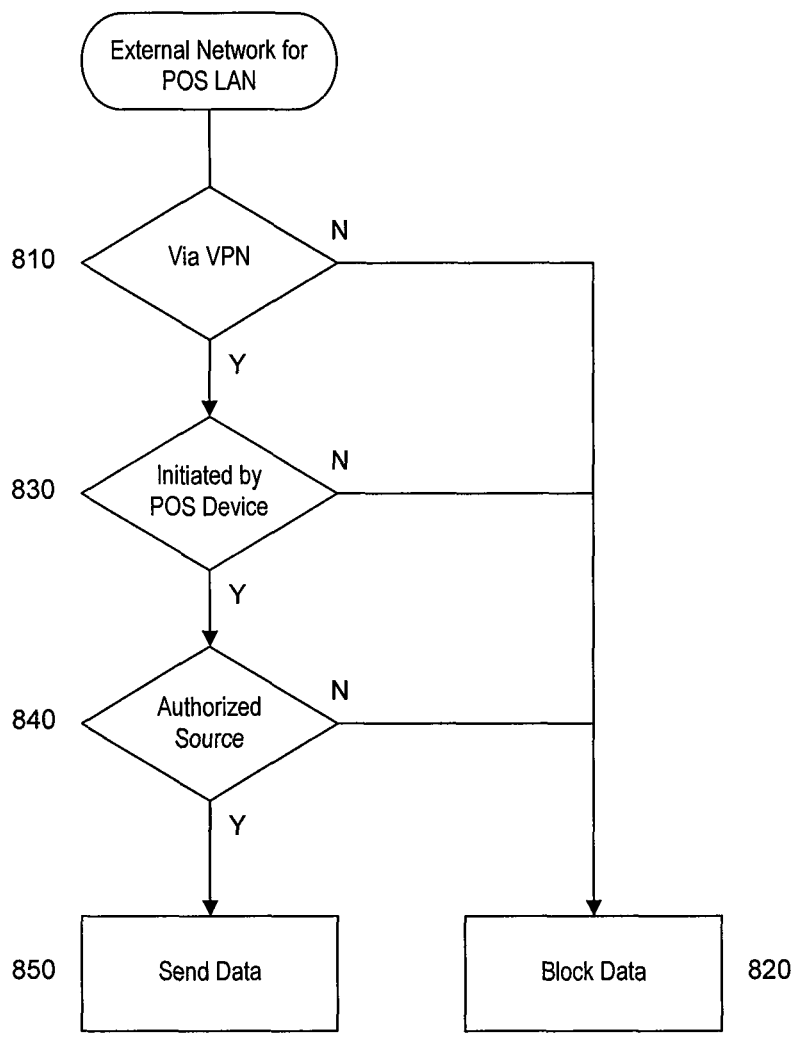
FIG. 8 is a flow diagram illustrating the process performed by the data control system for data from the external network that is destined for a point of sale device on the system LAN.

FIG. 8 is a flow diagram illustrating the "External Network for POS LAN" process performed by the data control system for data from the external network that is destined for a point of sale device on the system LAN. The point of sale device may be a wireless point of sale device 125 on the wireless point of sale LAN 120 or a wired point of sale device 145 on the wired point of sale LAN 140. In step 810, the data control system determines whether the data is received from the external network 160 via a secure connection. The secure connection is, for example, a virtual private network (VPN) connection established by an OpenVPN software program on the wireless router 110 as described above with reference to FIG. 5. If in step 810 it is determined that the data is received from the external network 160 other than via the VPN connection, the wireless router 110 blocks the data from being sent to the point of sale device in step 820.

If the data is received from the external network 160 via the VPN connection, then the data control system determines in step 830 whether the data is associated with a data communication session that was initiated by the point of sale device for which the data is now destined. If the data communication was not initiated by the point of sale device, the data control system blocks the data from being sent to the point of sale device in step 820.

If the data communication was initiated by the point of sale device, then the data control system determines in step 840 whether the data from the external network 160 is from an authorized source. For example, the wireless router 110 examines the data packet to determine whether the source internet protocol (IP) address contained therein corresponds to the IP address of the payment host 170 or secure host 180. If the data was not from an authorized source, the wireless router 110 blocks the data from being sent to the point of sale device in step 820.

In step 850, upon confirming that the data communication was initiated by the point of sale device for which the data is destined and received via a secure connection from an authorized source, the data control system allows the data from the external network 160 to be sent to the point of sale device. In a preferred embodiment, an intrusion detection system is employed to protect the wireless point of sale LAN 120 and wired point of sale LAN 140 from external attacks. For example, the wireless router 110 runs the "Snort" open source software program, provided by Sourcefire, Inc. In one embodiment, the intrusion detection system provides an alarm signal to the secure host 180 upon detecting data traffic indicative of a possible external attack based on predetermined criteria. The secure host 180 may then communicate with the wireless router 110 to take preventative or corrective action including, if necessary, shutting down some or all data traffic on the system LAN 100 until resolution or clearance from the secure host 180. Alternatively, the wireless router 110 may initiate its own preventative or corrective action.

Data from the External Network Over the Non-Point of Sale LAN

In another aspect of the invention, the data control system allows non-point of sale devices on the LAN to receive data from the external network when established conditions are met. The data control system may allow the data to be sent to the non-point of sale devices only, for example, when the data is associated with a communication session initiated by the non-point of sale device. The data control system may also allow the data to be sent to the non-point of sale device only if it is not received from a restricted source. The restricted source may be, for example, the secure host, the payment host, or any unidentified source. Additionally, the data control system may allow the data to be sent to the non-point of sale device only if the data has not been received via a secure connection reserved for point of sale devices. The secure connection is, for example, a virtual private network connection.

Figure 9:
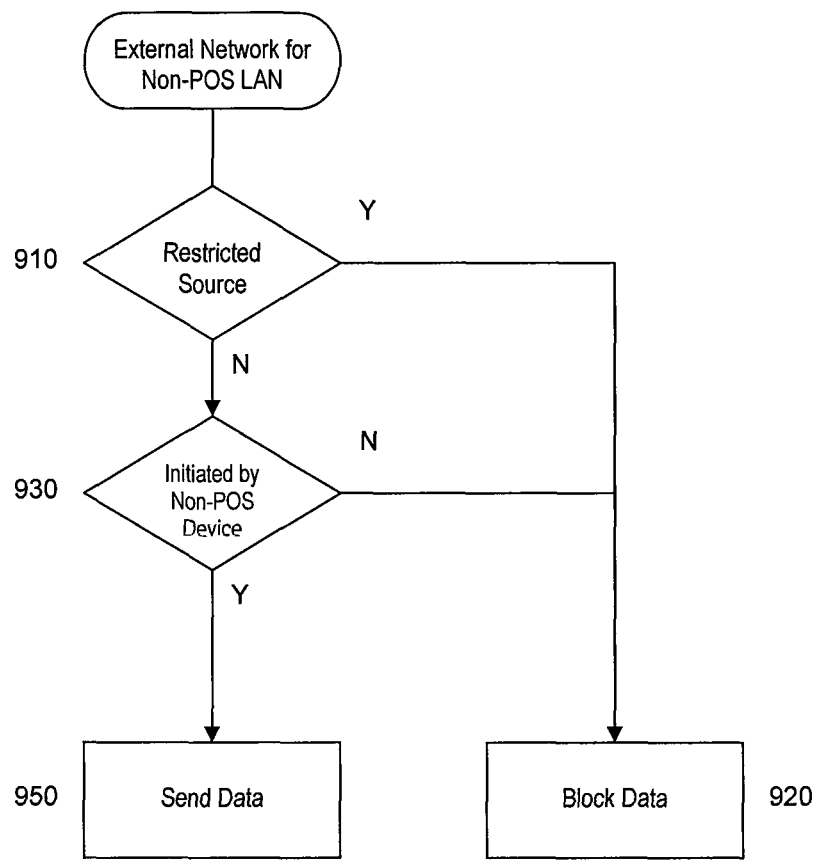
FIG. 9 is a flow diagram illustrating the process performed by the data control system for data from the external network that is destined for a non-point of sale device on the system LAN.

FIG. 9 is a flow diagram illustrating the "External Network for Non-POS LAN" process performed by the data control system for data from the external network that is destined for a non-point of sale device on the system LAN. The non-point of sale device may be a wireless non-point of sale device 135 on the wireless non-point of sale LAN 130 or a wired non-point of sale device 155 on the wired non-point of sale LAN 150.

In step 910, the data control system determines whether the data received from the external network 160 is from a restricted source that has been designated as a source that the non-point of sale devices are not allowed to received data from. For example, the wireless router 110 examines the data packet to determine whether the source internet protocol (IP) address contained therein corresponds to the IP address of the payment host 170 or secure host 180. A restricted source could also include any unidentified sources or sources not previously designated as sources the non-point of sale devices are authorized to receive data from based on information maintained by the wireless router 110 and/or the secure host 180. A restricted source may also be any source from which data is received via the VPN connection. If the data is from a restricted source, the data control system blocks the data from being sent to the non-point of sale device in step 920.

If the data is not from a restricted source, the data control system determines in step 930 whether the data communication session was initiated by the non-point of sale device for which the data is now destined. If data communication was not initiated by the non-point of sale device, the wireless router 110 blocks the data from being sent to the non-point of sale device in step 920. In step 950, upon confirming that the data communication was initiated by the non-point of sale device for which the data is destined and not received from a restricted source, the wireless router 110 allows the data from the external network 160 to be sent to the point of sale device.

In a preferred embodiment, an intrusion detection system is employed to protect the wireless non-point of sale LAN 130 and wired non-point of sale LAN 150 from external attacks. For example, the wireless router 110 runs the "Snort" open source software program, provided by Sourcefire, Inc. In one embodiment, the intrusion detection system provides an alarm signal to the secure host 180 upon detecting data traffic indicative of a possible external attack based on predetermined criteria. The secure host 180 may then communicate with the wireless router 110 to take preventative or corrective action including, if necessary, shutting down some or all data traffic on the system LAN 100 until resolution or clearance from the secure host 180. Alternatively, the wireless router 110 may initiate its own preventative or corrective action.

White List Management

Figure 10:
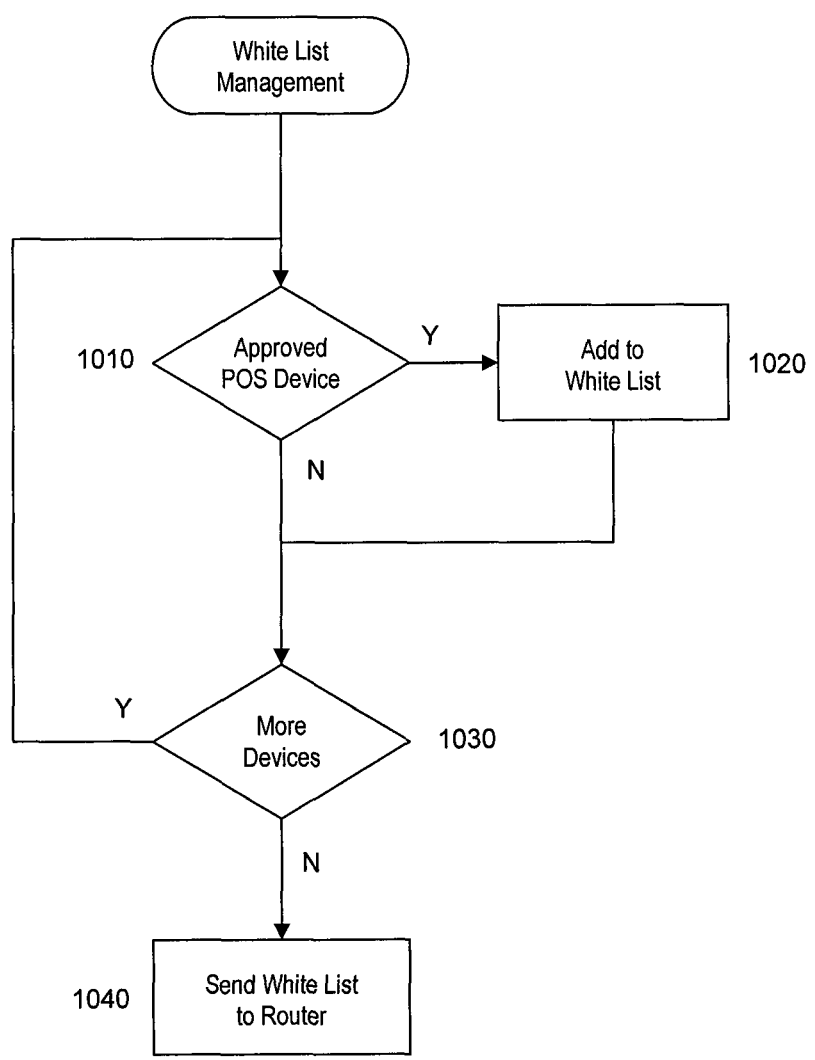
FIG. 10 is a flow diagram illustrating the process of managing a white list of approved point of sale devices in accordance with an embodiment of the invention.

FIG. 10 is a flow diagram illustrating the process of managing the white list of approved POS devices. As discussed above, the wireless router 110 utilizes the white list to determine which devices are allowed to access authorized destinations on the external network 160. The process shown in FIG. 10 is performed by the secure host 180 at an initial configuration of the system LAN 100 and at any later time as necessary to modify the definition of approved point of sale devices, such as when adding new devices to the system LAN 100 at a later time.

In step 1010, the secure host 180 determines whether a device has been identified as an authorized point of sale device. Such a device may be identified by a human operator or by an automated process which determines the device to be a legitimate point of sale device dedicated to processing point of sale transactions. Approval of the device may also require authentication and/or corroboration with information identifying the device in possession of the merchant.

If the secure host 180 determines in step 1010 that the device is an approved point of sale device, it adds a device identifier such as a media access control (MAC) address of the device to a white list in step 1020. If the secure host 180 determines in step 1030 that more devices remain to be considered, the secure host 180 repeats the above steps until all point of sale devices have been considered. Thereafter, the secure host 180 sends the white list to the wireless router 110 in step 1040.

The invention has been described above with reference to one or more illustrative embodiments. Based on this description, further modifications and improvements may occur to those skilled in the art. The claims are intended to cover all such modifications and changes as fall within the scope and spirit of the invention.

What is claimed is:

1. A method, performed by a data control system, for securing data on a local area network in communication with an external network, the local area network having one or more point of sale hardware devices and one or more non-point of sale hardware devices, the method comprising the steps of:
   (a) determining whether data destined for the external network is from a point of sale hardware device or from a non-point of sale hardware device;
   (b) allowing data from a point of sale hardware device to be sent to the external network via a secure connection; and
   (c) allowing data from a non-point of sale hardware device to be sent to the external network other than via the secure connection.

2. The method of claim 1 wherein the secure connection is a virtual private network connection.

3. The method of claim 1 wherein step (a) comprises determining whether the data is from a point of sale network.

4. The method of claim 1 wherein step (a) comprises determining whether the data is from a non-point of sale network.

5. The method of claim 1 wherein step (c) comprises allowing the data from the non-point of sale network to be sent to the external network unless the data is destined for a restricted destination.

6. A method, performed by a data control system, for securing data on a local area network in communication with an external network, the local area network having one or more point of sale hardware devices and one or more non-point of sale hardware devices, the method comprising the steps of:
(a) determining the data is from a non-point of sale hardware device on the local area network;
(b) allowing the data from the non-point of sale hardware device to be sent to the external network other than via a secure connection reserved for point of sale hardware devices; and
(c) preventing the data from the non-point of sale hardware device from being sent to the external network via the secure connection.

7. The method of claim 6 wherein the secure connection is a virtual private network connection.

8. The method of claim 6 wherein step (b) comprises allowing the data from the non-point of sale network to be sent to the external network unless the data is destined for a restricted destination.

9. The method of claim 8 wherein the restricted destination is a secure host.

10. The method of claim 8 wherein the restricted destination is a payment host.

11. A data control system for securing data on a local area network in communication with an external network, the local area network having one or more point of sale hardware devices and one or more non-point of sale hardware devices, the data control system comprising:
a router configured for determining whether data destined for the external network is from a point of sale hardware device or from a non-point of sale hardware device;
the router further configured for allowing data from a point of sale hardware device to be sent to the external network via a secure connection; and
the router further configured for allowing data from a non-point of sale hardware device to be sent to the external network other than via the secure connection.

12. The data control system of claim 11 wherein the secure connection is a virtual private network connection.

13. The data control system of claim 11 wherein the router for determining whether data destined for the external network is from a point of sale hardware device or from a non-point of sale hardware device is further configured for determining whether the data is from a point of sale network.

14. The data control system of claim 11 wherein the router for determining whether data destined for the external network is from a point of sale hardware device or from a non-point of sale hardware device is further configured for determining whether the data is from a non-point of sale network.

15. The data control system of claim 11 wherein the router for allowing data from the non-point of sale device to be sent to the external network is further configured for allowing the data from the non-point of sale network to be sent to the external network unless the data is destined for a restricted destination.

16. A data control system for securing data on a local area network in communication with an external network, the local area network having one or more point of sale hardware devices and one or more non-point of sale hardware devices, the data control system comprising:
a router configured for determining the data is from a non-point of sale hardware device on the local area network;
wherein the router is further configured for allowing the data from the non-point of sale hardware device to be sent to the external network other than via a secure connection reserved for point of sale hardware devices; and
wherein the router is further configured for preventing the data from the non-point of sale hardware device from being sent to the external network via the secure connection.

17. The data control system of claim 16 wherein the secure connection is a virtual private network connection.

18. The data control system of claim 16 wherein the router for allowing the data from the non-point of sale hardware device to be sent to the external network is further configured for allowing the data from the non-point of sale network to be sent to the external network unless the data is destined for a restricted destination.

19. The data control system of claim 18 wherein the restricted destination is a secure host.

20. The data control system of claim 18 wherein the restricted destination is a payment host.

\* \* \* \* \*